United States Patent
Silverstein et al.

(10) Patent No.: US 9,860,429 B1
(45) Date of Patent: Jan. 2, 2018

(54) SCALING OF IMAGE DATA IN SENSOR INTERFACE BASED ON DETECTION OF DEFECTIVE PIXELS

(71) Applicant: Apple Inc., Cupertino, CA (US)

(72) Inventors: D. Amnon Silverstein, Palo Alto, CA (US); Jaewon Shin, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/198,363

(22) Filed: Jun. 30, 2016

(51) Int. Cl.
*H04N 5/225* (2006.01)
*H04N 5/217* (2011.01)
*G06T 7/00* (2017.01)
*G06T 3/40* (2006.01)
*G06T 1/20* (2006.01)
*G06T 5/00* (2006.01)
*G06T 5/20* (2006.01)

(52) U.S. Cl.
CPC ............ *H04N 5/2176* (2013.01); *G06T 1/20* (2013.01); *G06T 3/4015* (2013.01); *G06T 5/002* (2013.01); *G06T 5/20* (2013.01); *G06T 7/0002* (2013.01); *G06T 2207/10024* (2013.01); *G06T 2207/20024* (2013.01)

(58) Field of Classification Search
CPC ........ G06K 9/40; G06T 5/002; G06T 2207/20182; G06T 2207/30216; H03M 3/342; H04N 1/58; H04N 1/60; H04N 1/624; H04N 9/093; H04N 9/097; H04N 9/646; H04N 9/70; H04N 9/71; H04N 9/7908; H04N 9/7912; H04N 9/7917; H04N 5/2176; H04N 5/2178; G01J 2001/444; H01L 27/14623
USPC .................................................. 348/241–251
See application file for complete search history.

(56) References Cited

U.S. PATENT DOCUMENTS

| 7,483,058 B1 | 1/2009 | Frank et al. | |
|---|---|---|---|
| 2004/0091174 A1* | 5/2004 | Wang | G06T 3/4007 382/300 |
| 2006/0126127 A1* | 6/2006 | Stanback | H04N 5/367 358/474 |
| 2007/0285535 A1* | 12/2007 | McGillvray | H04N 5/367 348/246 |
| 2007/0291142 A1* | 12/2007 | Noh | H04N 5/367 348/246 |
| 2011/0157413 A1* | 6/2011 | Yoshida | H04N 9/735 348/223.1 |

(Continued)

*Primary Examiner* — Twyler Haskins
*Assistant Examiner* — Dwight C Tejano
(74) *Attorney, Agent, or Firm* — Fenwick & West LLP

(57) ABSTRACT

Embodiments of the present disclosure relate to a sensor interface circuit that performs scaling of image data in a Bayer pattern without spreading defective pixels across multiple pixels. The sensor interface circuit may include a register circuit storing operating parameters of the sensor interface circuit. The sensor interface circuit includes a scaling circuit with a first defect pixel detection circuit to detect a first defective pixel in an input image by analyzing pixels in a line of an input image data along a first direction. A first scaling circuit is coupled to the first defect pixel detection circuit and generates a scaled line of pixels representing the line of the input image scaled along the first direction according to the operating parameters.

20 Claims, 8 Drawing Sheets

(56) References Cited

U.S. PATENT DOCUMENTS

| | | | |
|---|---|---|---|
| 2011/0261217 A1* | 10/2011 | Muukki | G06T 3/4015 |
| | | | 348/222.1 |
| 2013/0094705 A1 | 4/2013 | Tyagi et al. | |
| 2013/0229395 A1* | 9/2013 | Mills | H04N 5/367 |
| | | | 345/207 |
| 2014/0211048 A1* | 7/2014 | Kolli | H04N 5/3675 |
| | | | 348/246 |
| 2015/0036942 A1 | 2/2015 | Smirnov et al. | |
| 2015/0116545 A1 | 4/2015 | Ovsiannikov et al. | |
| 2015/0319385 A1 | 11/2015 | Ku et al. | |
| 2016/0119578 A1* | 4/2016 | Nakano | H04N 7/0142 |
| | | | 382/300 |

* cited by examiner

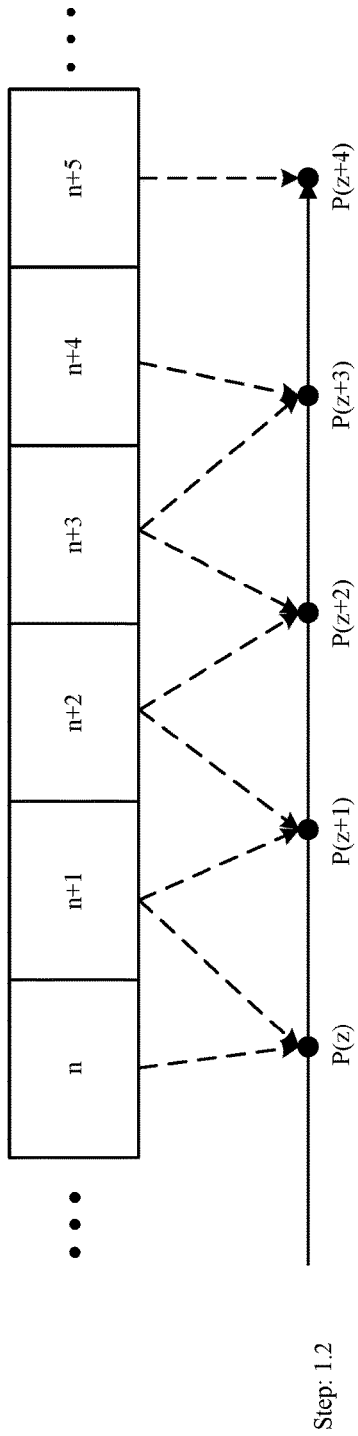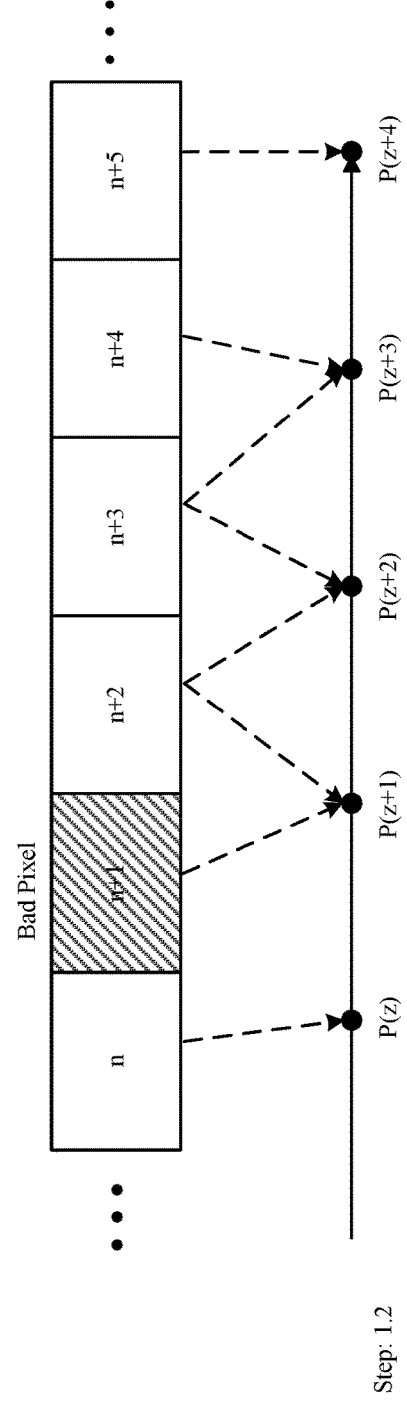
FIG. 6A
FIG. 6B

SCALING OF IMAGE DATA IN SENSOR INTERFACE BASED ON DETECTION OF DEFECTIVE PIXELS

BACKGROUND

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on a central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

The image processing pipeline often includes a sensor interface to perform horizontal and vertical scaling of the captured image data for various purposes. Downscaling the captured image data, for example, reduces the size of the image data and the power consumption associated with further processing of the image data in subsequent components of the image processing pipeline. However, the scaling of image data may have an undesirable property of spreading defective pixels from the captured image data across multiple pixels of the scaled image data because a pixel of an unscaled image data may be used for generating multiple pixels in a scaled image data by interpolation.

SUMMARY

Embodiments of the present disclosure relate to a sensor interface circuit that performs scaling of image data in a Bayer pattern without spreading defective pixels across multiple pixels. The sensor interface circuit may include a register circuit storing operating parameters of the sensor interface circuit. The sensor interface circuit includes a scaling circuit with a first defect pixel detection circuit to detect a first defective pixel in an input image by analyzing pixels in a line of an input image data along a first direction. A first scaling circuit is coupled to the first defect pixel detection circuit and generates a scaled line of pixels representing the line of the input image scaled along the first direction according to the operating parameters by (i) defining first subsets of pixels in the line of the input image so that the first defective pixel is included in only one of the first subsets of pixels, and (ii) filtering each of the defined first subsets of pixels through a first multi-tap polyphase filter.

BRIEF DESCRIPTION OF THE DRAWINGS

FIG. 6A is a diagram illustrating an example operation of scaling a line of pixels through a two-tap filter, according to one embodiment.

FIG. 6B is a diagram illustrating an example operation of scaling a line of pixels through a two-tap filter when a defective pixel is included, according to one embodiment.

Figure 1:
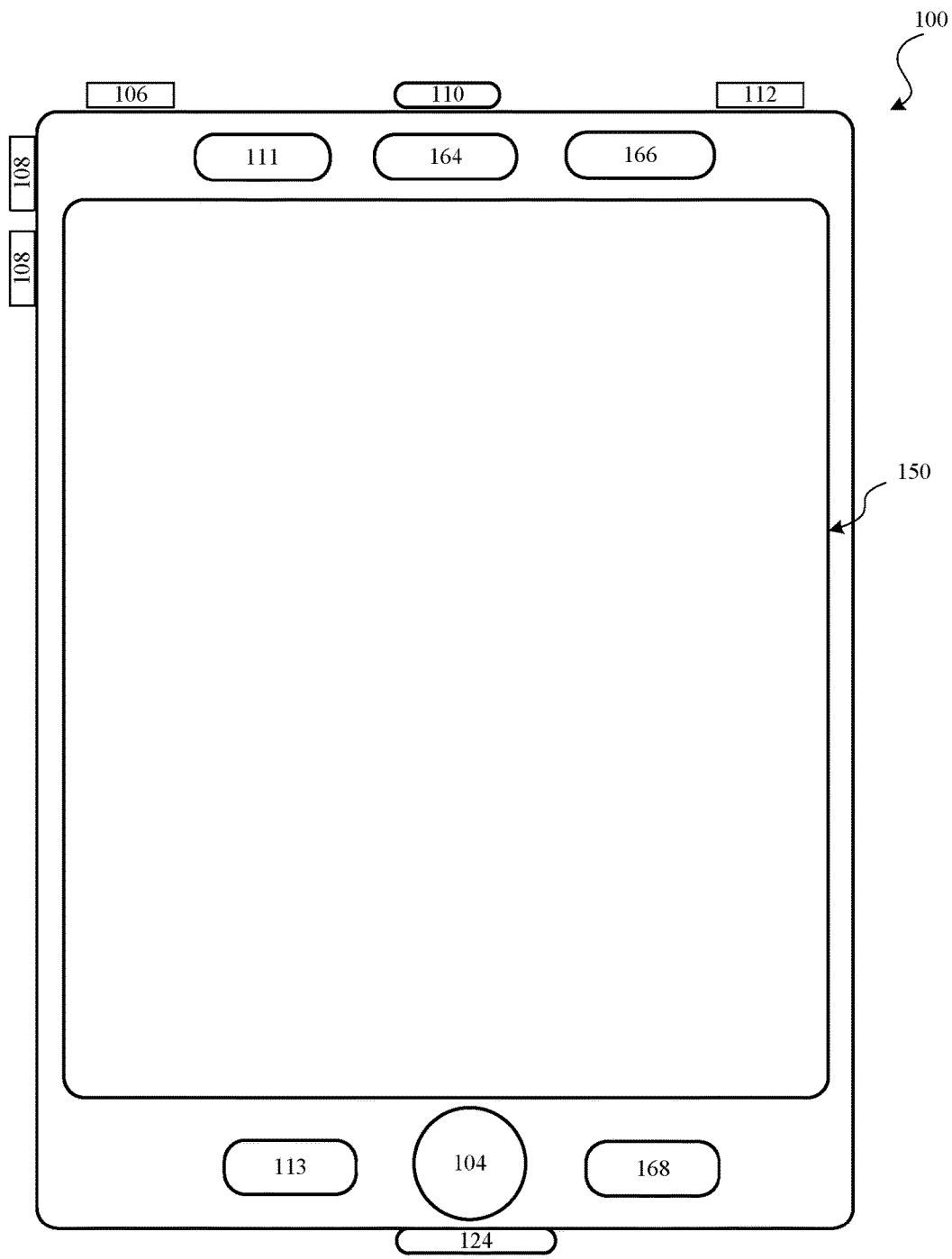
FIG. 1 is a high-level diagram of an electronic device, according to one embodiment

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a sensor interface that performs scaling of image data in a Bayer pattern without spreading defective pixels across multiple pixels. The sensor interface circuit may include a register circuit for storing operating parameters of the sensor interface circuit. The sensor interface circuit includes a defect pixel detector to identify defective pixels in an input image and a scaling circuit to generate a scaled image without spreading defective pixels across multiple pixels of the scaled image data. After detecting defective pixels, the sensor interface circuit scales the input image by using the defective pixels to generate no more than one pixel in the scaled image.

An operating parameter described herein refers to a value that defines how a component in a sensor interface circuit is to operate. Operating parameters can be set for the sensor interface to operate under normal or default operating conditions or other specific operating conditions. An operating parameter can be associated with different components of the sensor interface circuit such as a crop or binning component, a defect pixel detector, and a scaler. The operating parameter may be a Boolean value that simply enables or disables components or methods associated with the different components of the sensor interface circuit.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
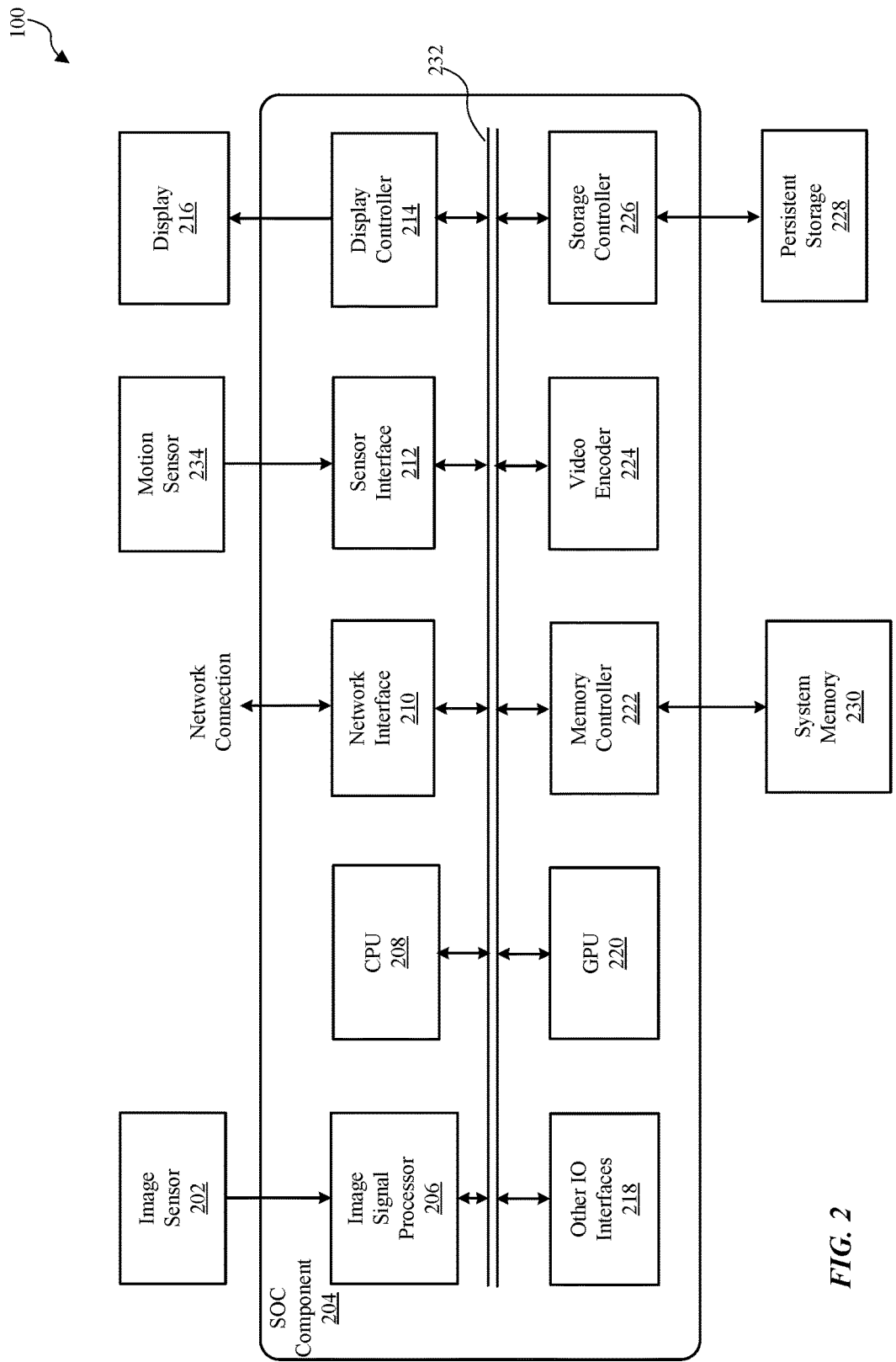
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

Image sensor 202 is a component for capturing image data and may be embodied, for example, as a complementary metal-oxide-semiconductor (CMOS) active-pixel sensor a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 216 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
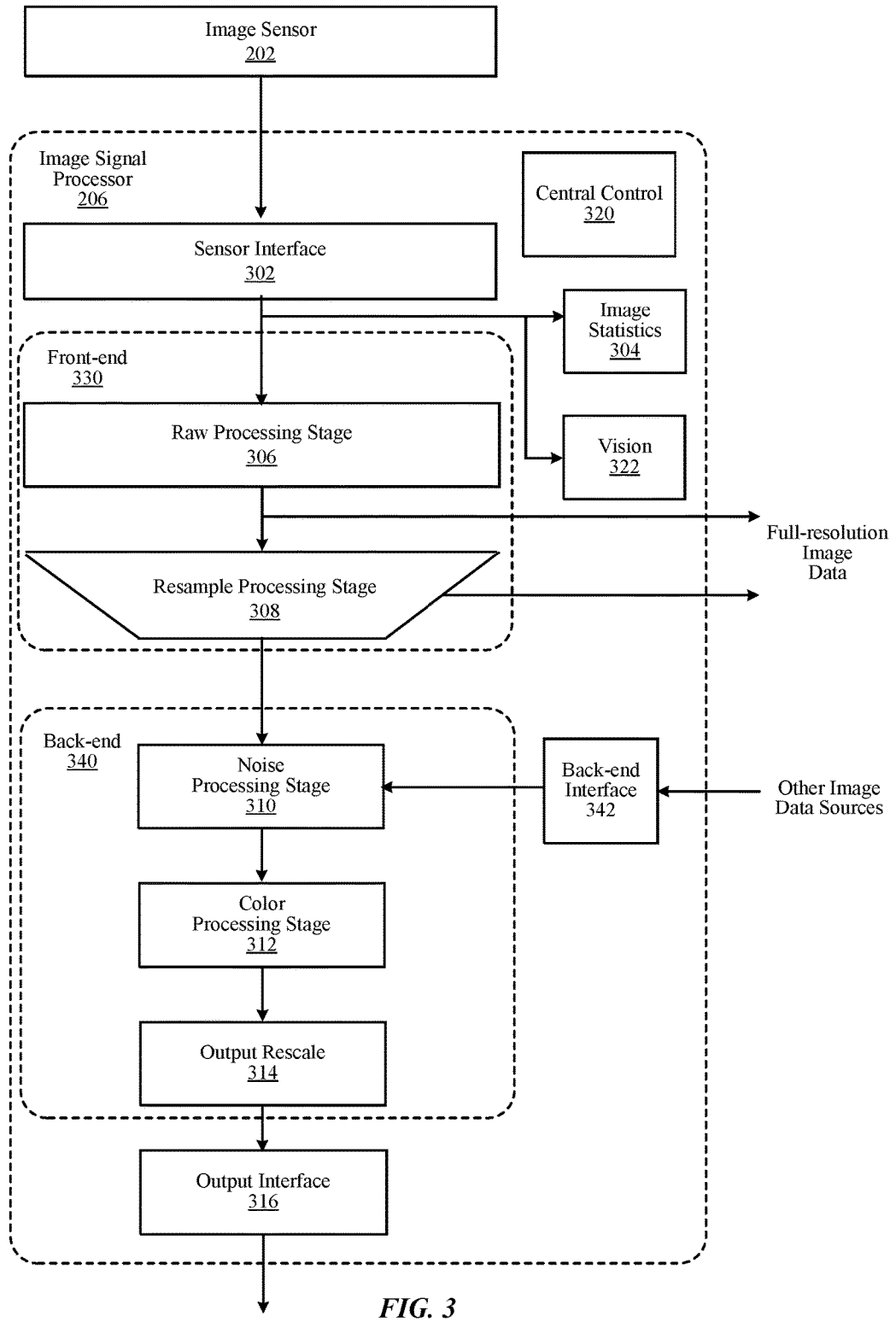
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor 202 and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, convolution and generation of histogram-of-orientation gradients (HOG). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. Convolution is heavily used tools in image/video processing and machine vision. Convolution may be performed, for example, to generate edge maps of images or smoothen images. HOG provides descriptions of image patches for tasks in image analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement an image data line buffer including one or more lines of pixels to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window.

For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 314 to various other components of system 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Sensor Interface Scaler with Defect Pixel Detection and Handling

Sensor interface 302 receives raw image data from image sensor 202 or other sources in a Bayer pattern, and outputs preprocessed image data to subsequent stages of the image processing pipeline for further processing. For this purpose, sensor interface 302 may perform various preprocessing operations such as image cropping, binning or scaling to reduce image data size. The reduced size of the image data has advantages such as reducing the power consumption associated with further processing of the image data in subsequent components of the image processing pipeline. However, during scaling, defective pixels from the raw image data may spread across multiple pixels of the scaled image data due to the use of multi-tap filters. The sensor interface 302 avoids or alleviates spreading of such defective pixels by processing defective pixels in a way different compared to non-defective pixels during scaling.

Figure 4:
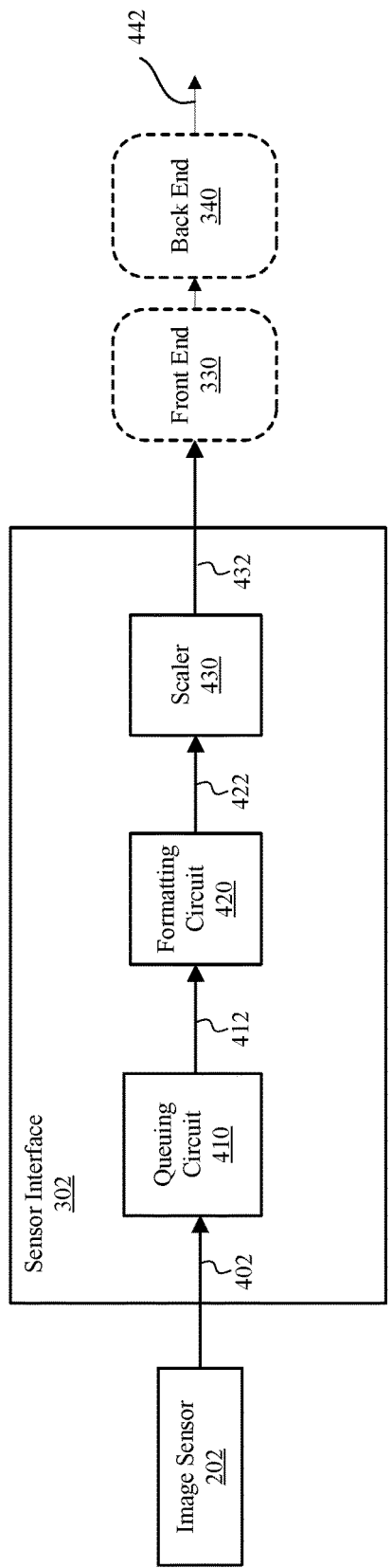
FIG. 4 is a block diagram of the sensor interface, according to one embodiment.

FIG. 4 is a block diagram of the sensor interface 302 according to one embodiment. The sensor interface 302 receives raw image data 402 from the image sensor 202 and processes the raw image data 402 into scaled image data 432 for subsequent stages in the pipeline (e.g., front end 330 and back end 340). The raw image data 402 may be in a Bayer pattern. Among other operations, the sensor interface 302 performs scaling of the raw image data 402.

The sensor interface 302 may include, among other components, a queuing circuit 410, a formatting circuit 420, and a scaler 430. The output of the image sensor 202 is raw image data 402. The sensor interface 302 may include other components not illustrated in FIG. 4 such as direct memory access (DMA) engines that write formatted or unformatted sensor data to DRAM.

The queuing circuit 410 is a circuit that regulates the rate of image data received from the image sensor 202. The queuing circuit 410 samples the raw image data 402 from the image sensor 202, buffers the raw image data 402 in a queue, and transmits the buffered raw image data as queued image data 412 to the formatting circuit 420 at a predetermined rate.

The formatting circuit 420 is a circuit that formats data into a specific format. The formatting circuit 420 receives queued image data 412, transforms the queued image data 412 into formatted image data 422 and outputs formatted image data 422.

The scaler 430 is a circuit that scales image data with a scaling ratio without spreading defective pixels. The scaler 430 receives formatted image data 422, scales the formatted image data 422 into a specific size, and outputs scaled image data 432. The scaled image data 432 may be a Bayer pattern encoded data. For each output pixel of scaled image data 432, the scaler 430 selects one or more pixels from the formatted image data 442 and interpolates pixel values for the output pixel using the pixel data of the selected one or more pixels. The operation of scaler 430 is described below in detail with reference to FIGS. 5, 6A, 6B, 7A, and 7B.

The structure of the sensor interface 302 in FIG. 4 is merely illustrative. Different embodiments of the sensor interface may include other components for performing further operations such as binning and cropping that are executed in parallel or in series with respect to the scaler 430.

Figure 5:
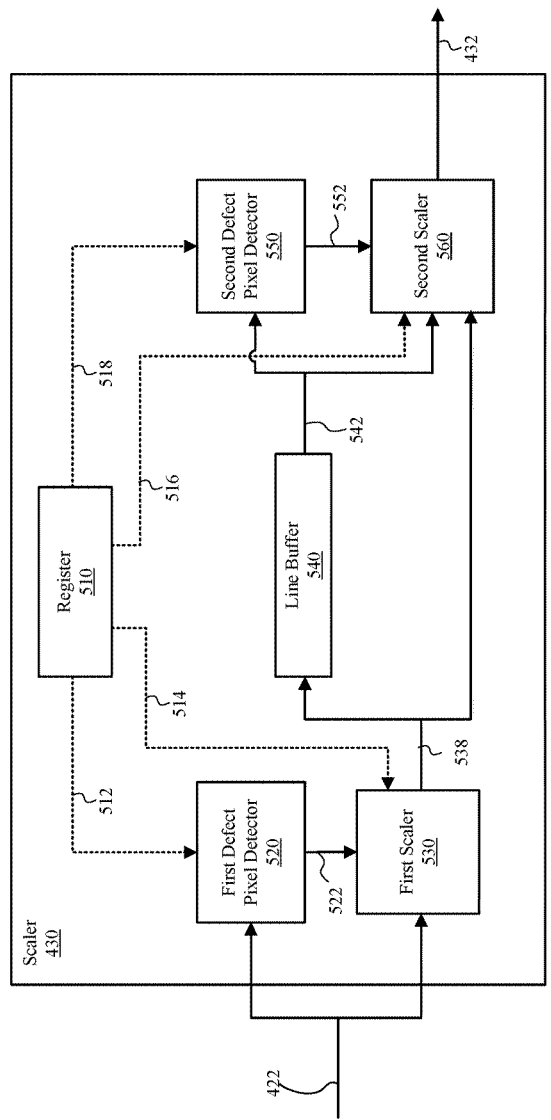
FIG. 5 is a block diagram of a scaler according to one embodiment.

FIG. 5 is a block diagram of the scaler 430 according to one embodiment. The scaler 430 receives formatted image data 422 from the formatting circuit 420 and performs scaling on the formatted image data 422 to output scaled image data 432 while detecting defective pixels in the formatted image data 422 and preventing the spreading of defective pixel data in the scaled image data 432. The scaler 430 may include, among other components, a register 510, a first defect pixel detector 520, a first scaler 530, a line buffer 540, a second defect pixel detector 550, and a second scaler 560.

The register 510 is a memory circuit that stores operating parameters. The register circuit may receive operating parameters for storing from the central control 320 during a configuration cycle. One or more operating parameters may enable or disable various components in the scaler 430. For example, an enable operating parameter would enable cropping, binning, defect pixel detection, horizontal scaling or vertical scaling if the value is set to "1" and disable or bypass components for performing these operations if the value is set to "0." Each component may have component-specific operating parameters to control the mode of operation at each component. Such operating parameters may enable a particular type of defect pixel detection (e.g., white pixel detection and black pixel detection), define threshold values used in determining which pixels are deemed defective (e.g., white pixel threshold and black pixel threshold), define a size (e.g., height and width) of the output picture, and a scaling ratio. The operating parameters will be described in more detail below with reference to the first defect pixel detector 520 and first scaler 530.

The first defect pixel detector 520 is a circuit that detects defective pixels along a first direction (e.g., horizontal direction). The first defect pixel detector 520 receives formatted image data 422 from the formatting circuit 420 and operating parameters 512 from register 510. The formatted image data 422 may be sent in raster order (line by line). Each line of the formatted image data 422 includes pixels and each pixel may be examined by the first defect pixel detector 520 to determine if the pixel is defective.

The first defect pixel detector 520 may determine that a pixel is defective by using or more of the following criteria: (i) white pixel criterion (ii) black pixel criterion (iii) max neighbor criterion and (iv) min neighbor criterion. The first defect pixel detector 520 uses the defective pixel criteria to identify pixels that are significantly larger or smaller in value than a predetermined number of neighboring pixel values, where significantly larger or smaller is defined by threshold values corresponding to each criteria. The white pixel criterion may be evaluated by determining if the pixel value is significantly larger than the neighboring pixel values. The black pixel criterion may be evaluated by determining if the pixel value is significantly smaller than the neighboring pixel values. The max neighbor criterion and min neighbor criterion are variations of the white and black pixel criterion, but identifies significantly larger or smaller pixel values by comparing the difference of the pixel to the maximum or minimum neighboring value to the range of neighboring values (i.e., maximum neighbor value–minimum neighbor value).

In one embodiment, evaluating the criteria involves computing a ratio that quantifies how the pixel value is different from neighboring pixel values, comparing the computed ratio to a corresponding threshold value, and determining if the pixel is defective if the computed ratio is larger than the corresponding threshold value. The threshold values may be defined by operating parameters 512. For the white pixel criterion, a white pixel ratio is a ratio between the pixel value of a pixel and the average value of a predetermined number of pixels neighboring the pixel. If the pixel value is larger than those of the neighboring values, the white pixel ratio may also be a large value. If the white pixel ratio is greater than a white pixel threshold value, then the first defect pixel detector 520 determines that the pixel is defective. For the black pixel criterion, a black pixel ratio is a ratio between the average value of a predetermined number of neighboring pixels and the pixel value of the pixel. If the pixel value of the pixel is smaller than pixel values of its neighboring pixels, the black pixel ratio may be a large value. If the black pixel ratio is greater than a black pixel threshold value, then the first defect pixel detector 520 determines that the pixel is defective. For the max neighbor criterion, a max neighbor ratio may be the difference between the pixel value and the maximum neighboring pixel value to a range of neighboring pixel values of a predetermined number of neighboring pixels. If the pixel is larger than the neighboring pixel values, the difference of the pixel value and the maximum neighboring pixel value may be a large value and the max neighbor ratio may also be a large value. If the max neighbor ratio is greater than a max neighbor threshold value, then the first defect pixel detector 520 determines that the pixel is defective. For the min neighbor criterion, a min neighbor ratio may be the difference between the minimum neighboring pixel value to a range of neighboring pixel values of a predetermined number of neighboring pixels. If the pixel value is smaller than the neighboring pixel values, the difference of the minimum neighboring pixel value to the pixel value may be a large value, and the min neighbor ratio may also be a large value. If the min neighbor ratio is greater than a min neighbor threshold value, then the first defect pixel detector 520 determines that the pixel is defective.

The first defect pixel detector 520 outputs a first defective pixel flag 522 when it identifies that a pixel is defective. The first defective pixel flag 522 may be a single bit of information in which a "1" indicates the pixel is defective and a "0" indicates the pixel is not defective.

The operating parameters 512 may include enable parameters to enable first defect pixel detector 520 or enable types of first defect pixel detection criteria (e.g., white pixel, black pixel, max neighbor, min neighbor criteria) for detecting first defective pixels, or may include value parameters to set threshold values for pixel detection criteria. When the enable parameter is set to "1", the first defect pixel detector 520 or specific criteria for detecting defective pixels is enabled, and when the enable parameter is set to "0", the first defect pixel detector 520 or specific criterion for detecting defective pixels is disabled. For example, the first defect pixel detector 520 may be configured to only use the white pixel and black pixel criteria for detecting first defective pixels and set a white pixel enable and a black pixel enable parameter to "1" and a max neighbor enable and a min neighbor enable parameter to "0." The first defect pixel detector 520 may use threshold values defined by operating parameters 512 to identify defective pixels for different criteria. For example, the operating parameters 512 include a white pixel threshold, a black pixel threshold, a max neighbor threshold, and a min neighbor threshold.

The first scaler 530 is a circuit that scales image data to a first scaling ratio in a first direction without spreading defective pixels to neighboring pixels in the first direction. The first scaler 530 sets the spacing between pixels of the scaled image data 538 in a first direction relative to the original spacing between pixels of the formatted image data 422 in a first direction according to the scaling ratio. The first scaler 530 receives formatted image data 422 from the formatting circuit 420, along with a first defective pixel flag 522 corresponding to each pixel of the formatted image data 422 from the first defect pixel detector 520, and operating parameters 514 from the register 510. The first scaler 530 scales lines of formatted image data 422 based on the first defective pixel flag 522 for each pixel in the lines of formatted image data 422 according to operating parameters 514 and output the lines of first scaled image data 538. For each pixel in a line of first scaled image data 538, the first scaler 530 may select a predetermined number of pixels based on pixel locations (e.g., closest in distance to a corresponding output pixel). To reduce the effect of spreading defective pixels, the first scaler 530 selects defective pixels only once for interpolating a pixel value of an output pixel. For example, if the first scaler 530 determines that a defective pixel was previously selected for scaling an output pixel in a line of first scaled image data 538, the first scaler 530 does not select the defective pixel again for interpolating a value for a different output pixel in the line of first scaled image data 538. The first scaler 530 interpolates the pixel values of multiple pixels using a first multi-tap polyphase filter to generate the pixel value for a corresponding output pixel. In one or more embodiments, a pixel value of one pixel, instead of pixel values of multiple pixels, may be used to generate a pixel value for an output pixel as described below in detail with reference to FIGS. 6A and 6B.

The operating parameters 514 may include enable parameters to enable first scaler 530 or a type of scaling filter (e.g., a two-tap polyphase filter and a four-tap polyphase filter), and may include value parameters to set a first size ratio, a first scaling ratio, and a first offset value for scaling lines of pixels. When the enable parameter is set to "1," the first scaler 530 or a type of scaling method is enabled, and when the enable parameter is set to "0," the first scaler 530 or a type of scaling method is bypassed or disabled. The first scaler 530 may use a first size ratio to set the size of the scaled output image relative to the input image in the first direction (e.g., the number of in a row of the first scaled image data 538 relative to the number of pixels in a row of the formatted image data 422). The first scaler 530 may use a first scaling ratio to set the spacing between pixels of the scaled output image relative to the input image in the first direction (e.g., spacing between pixels of a line of the first scaled image data 538 relative to the original spacing between pixels of a line of the formatted image data 422). For example, the original spacing between pixels of a line of the formatted image data 422 is 1 and a first scaling ratio of 1.2 sets the spacing for the line of scaled image data to become 1.2 relative to the original spacing between pixels of 1. The first scaler 530 may use a first offset value to set the position of the pixels in the output image relative to the input image (e.g., the position of a line of first scaled image data 538 relative to the position of pixels of a line of the formatted image data 422). For example, the formatted image data has an offset of 0 and a first offset may be set to 0.2 to offset the position of the first scaled pixel data 538 relative to the formatted image data 422 by 0.2 units.

The line buffer 540 is a memory component that stores one or more lines of first scaled image data 538 for outputting one or more lines of pixels 542 in a predetermined order for processing at the second defect pixel detector 550 and the second scaler 560. Specifically, the line buffer 540 stores multiple lines of pixels such that defective pixels may be detected in a second direction and scaled in the second direction. The second direction may be a vertical direction. For example, the second defect pixel detector 550 and the second scaler 560 may use the same indexed pixel (e.g., first pixel, second pixel and third pixel) in multiple rows of pixels to construct a vertical line or column of pixels for defect pixel detection and scaling. In one embodiment, the line buffer 540 may store an additional bit of information for each pixel indicating whether the pixel is a defective pixel.

The second defect pixel detector 550 is a circuit that detects defective pixels along the second direction. The second defect pixel detector 550 is similar to the first defect pixel detector 520 except that defective pixels are identified along the second direction instead of the first direction. To perform its operation, the second defect pixel detector 550 receives one or more lines of pixels 542 from the line buffer 540 and operating parameters 518 from the register 510. The second defect pixel detector 550 may generate a column of pixels by selecting the same indexed pixel (e.g., first pixel, second pixel, and third pixel) from multiple lines of pixels 542 stored in the line buffer 540. The second defect pixel detector 550 then processes the column of pixels in the same manner as the first defect pixel detector 520 processes a row of pixels except that the detection and reduction of spreading of defective pixels occurs in the second direction instead of the first direction. The second defect pixel detector 550 uses the same criteria as explained above with reference to the first defect pixel detector 520 to determine that a pixel is defective. The second defect pixel detector 550 outputs a second defective pixel flag 552 that is similar to the first defective pixel flag 522 except that the second defective pixel flag 552 identifies defective pixels in the second direction instead of the first direction.

The operating parameters 518 sent to the second defect pixel detector 550 are similar to the operating parameters 512 except the operating parameters 518 are parameters for configuring the second defect pixel detector 550.

The second scaler 560 is a circuit that scales lines of pixels 542 in the second direction with a second scaling ratio. The second scaling ratio sets the spacing between pixels in the second direction of the scaled image data 432 relative to the spacing between pixels in the second direction of the first scaled image data 538. The second scaler 560 is similar to the first scaler 530 except that scaling is performed in a second direction instead of a first direction. The second scaler 560 receives the one or more lines of pixels 542 from the line buffer 540, the defective pixel flag 552 from the second defect pixel detector 550 and operating parameters 516 from the register 510.

The second scaler 560 may scale columns of first scaled image data 538 based on the second defective pixel flag 552 for each pixel in the columns of first scaled image data 538 according to operating parameters 516, and output the lines of scaled image data 432. The second scaler 560 also may select a predetermined number of pixels along the second direction and interpolates the selected pixels to generate an output pixel in the scaled image data 432, in a manner similar to the first scaler 530. To reduce the effect of spreading defective pixels, the second scaler 560 selects defective pixels only once for interpolating output pixel data values as described above with reference to the first scaler 530. The operating parameters 516 are similar to the operating parameters 514 except that the operating parameters 516 are parameters for configuring the second scaler 560, and therefore, the detailed description thereof is omitted herein for the sake of brevity.

The components and their function in the scaler 430 of FIG. 5 are merely illustrative. In other embodiments, the scaler may not include all or one of the following components: line buffer 540, second defect pixel detector 550, and second scaler 560. For example, the scaler may not detect defective pixels in the second direction and the second defect pixel detector 550 may be omitted. Further, the scaler may use information from the first pixel detector 520 for scaling in the second direction, and the line buffer 540 may append information from the first pixel detector 520 to the first scaled image data 538 to indicate which pixels of the first scaled image data 538 are defective.

Example of Handling Defect Pixels

FIG. 6A is a diagram illustrating an example operation of scaling a line of pixels through a two-tap filter, according to one embodiment. In this example, no defective pixel is assumed to be present in the formatted image data 422 to be scaled.

Pixel positions (n), (n+1), (n+2), (n+3), (n+4) and (n+5) indicate locations of pixels in a row of formatted image data 422 from image sensor 202 with a scaling ratio of 1. Pixel positions P(z), P(z+1), P(z+2), P(z+3), P(z+4), P(z+5) indicated locations of pixels in a row of first scaled image data 538 with a step size of 1.2. In a two-tap filter, each pixel of first scaled image data 538 is interpolated from two pixels of formatted image data 422 at locations closest to the pixel of the first scaled image data 538, except for pixels of the first scaled image data 538 with pixels of the formatted image data 422 at coinciding locations.

Specifically, the pixel value of first scaled image data 538 at P(z) is determined by interpolating the pixel values of formatted image data 422 at pixel positions (n) and (n+1). The pixel value of pixel P(z+1) in first scaled image data 538 at P(z+1) is determined by interpolating the pixels values of formatted image data 422 at pixel positions (n+1) and (n+2). The pixel value of first scaled image data 538 at P(z+2) is determined by interpolating the pixel values of formatted image data 422 at pixel positions (n+2) and (n+3). The pixel value of first scaled image data 538 at P(z+3) is determined by interpolating the pixel values of formatted image data 422 at pixel positions (n+3) and (n+4). The pixel value of scaled image data at P(z+4) is determined by the value of formatted image data 422 at pixel position (n+5) because the pixels are at coinciding locations.

FIG. 6B is a diagram illustrating an example operation of scaling a line of pixels through a two-tap filter similar to FIG. 6A except that the formatted image data 422 include a defective pixel, according to one embodiment. The example operation of FIG. 6B is similar to the embodiment of FIG. 6A except that the image sensor pixel at pixel position (n+1) is a defective pixel.

The scaler 430 handles the defective pixel at pixel position (n+1) by using the defective pixel only once for determining an output pixel value for the first scaled image data 538. In this embodiment, the scaler 430 assigns the defective pixel for use only once, to interpolate the output pixel closest in position to the defective pixel. Specifically, the scaler 430 assigns the bad pixel (n+1) for interpolating the pixel value of first scaled image data 538 at P(z+1) and not P(z). Thus, the pixel value of first scaled image data 538 at P(z) is determined by the pixel value of formatted image data 422 at pixel position (n) and not the pixel value at position (n+1). The pixel value of scaled image data at P(z+1), P(z+2), P(z+3), and P(z+4) are determined in the same way as the embodiment of FIG. 6A.

Figure 7A:
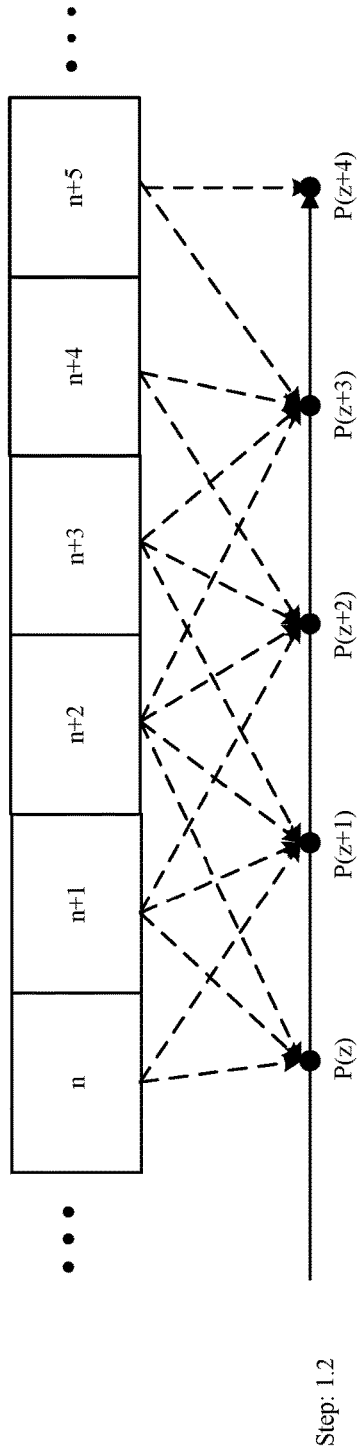
FIG. 7A is a diagram illustrating an example operation of scaling a line of pixels through a four-tap filter, according to one embodiment.

FIG. 7A is a diagram illustrating an example operation of scaling a line of pixels through a four-tap filter, according to one embodiment. The example operation of FIG. 7A is similar to the embodiment of FIG. 6A except that a four-tap filter is used. As in the embodiment of FIG. 6A, no defective pixel is assumed to be present in the formatted image data 422 in the example of FIG. 7A.

In a four-tap filter, each pixel of first scaled image data 538 is based on its four closest pixels of formatted image data 422, except for pixels of the first scaled image data 538 with pixels of the formatted image data 422 at coinciding locations. Specifically, the pixel value of first scaled image data 538 at P(z) is determined by interpolating the pixel value of formatted image data 422 at pixel position (n), (n+1), and (n+2). The pixel value of first scaled image data 538 at P(z+1) is determined by interpolating the values of formatted image data 422 at pixel positions (n), (n+1), (n+2) and (n+3). The pixel value of first scaled image data 538 at P(z+2) is determined by interpolating the values of formatted image data 422 at pixel positions (n+1), (n+2), (n+3) and (n+4). The pixel value of first scaled image data 538 at P(z+3) is determined by interpolating the values of formatted image data 422 at pixel positions (n+2), (n+3), (n+4) and (n+5). The pixel value of scaled image data at P(z+4) is determined by interpolating the value of formatted image data 422 at pixel position (n+5) because the pixels are at coinciding locations.

Figure 7B:
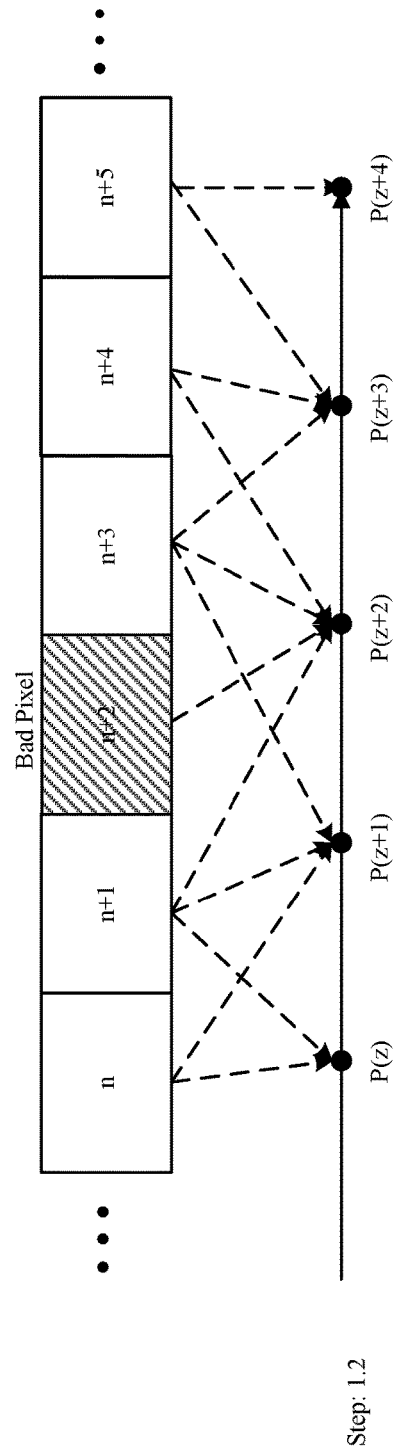
FIG. 7B is a diagram illustrating an example operation of a scaling a line of pixels through a four-tap filter when a defective pixel is included, according to one embodiment.

FIG. 7B is a diagram illustrating an example operation of a scaling a line of pixels through a four-tap filter when a defective pixel is included, according to one embodiment. The example operation of FIG. 7B is similar to the embodiment of FIG. 7A except the image sensor pixel at pixel position (n+2) is a defective pixel. The scaler 430 handles the defective pixel at pixel position (n+2) by using the defective pixel only once for determining an output pixel value for the first scaled image data 538. In this embodiment, the scaler 430 assigns the defective pixel for use only once, to interpolate the output pixel closest in position to the defective pixel.

Specifically, the scaler 430 assigns the bad pixel (n+2) for interpolating the pixel value of first scaled image data 538 at P(z+2) and not P(z), P(z+1), and P(z+3). The pixel value of first scaled image data 538 at P(z) is determined by the pixel value of formatted image data 422 at pixel position (n) and (n+1) not the pixel value at position (n+2). The pixel value of first scaled image data 538 at P(z+1) is determined by the pixel value of formatted image data 422 at pixel position (n), (n+1), and (n+3) not the pixel value at position (n+2). The pixel value of first scaled image data 538 at P(z+3) is determined by interpolating the values of formatted image data 422 at pixel positions (n+3), (n+4) and (n+5) not the pixel value at position (n+2). The pixel value of scaled image data at P(z+2) and P(z+4) are determined the same as embodiment of FIG. 7A.

FIG. 6A through FIG. 7B are merely examples and other variations of scaling a line of pixels could also be used.

Example Method of Scaler of the Sensor Interface

Figure 8:
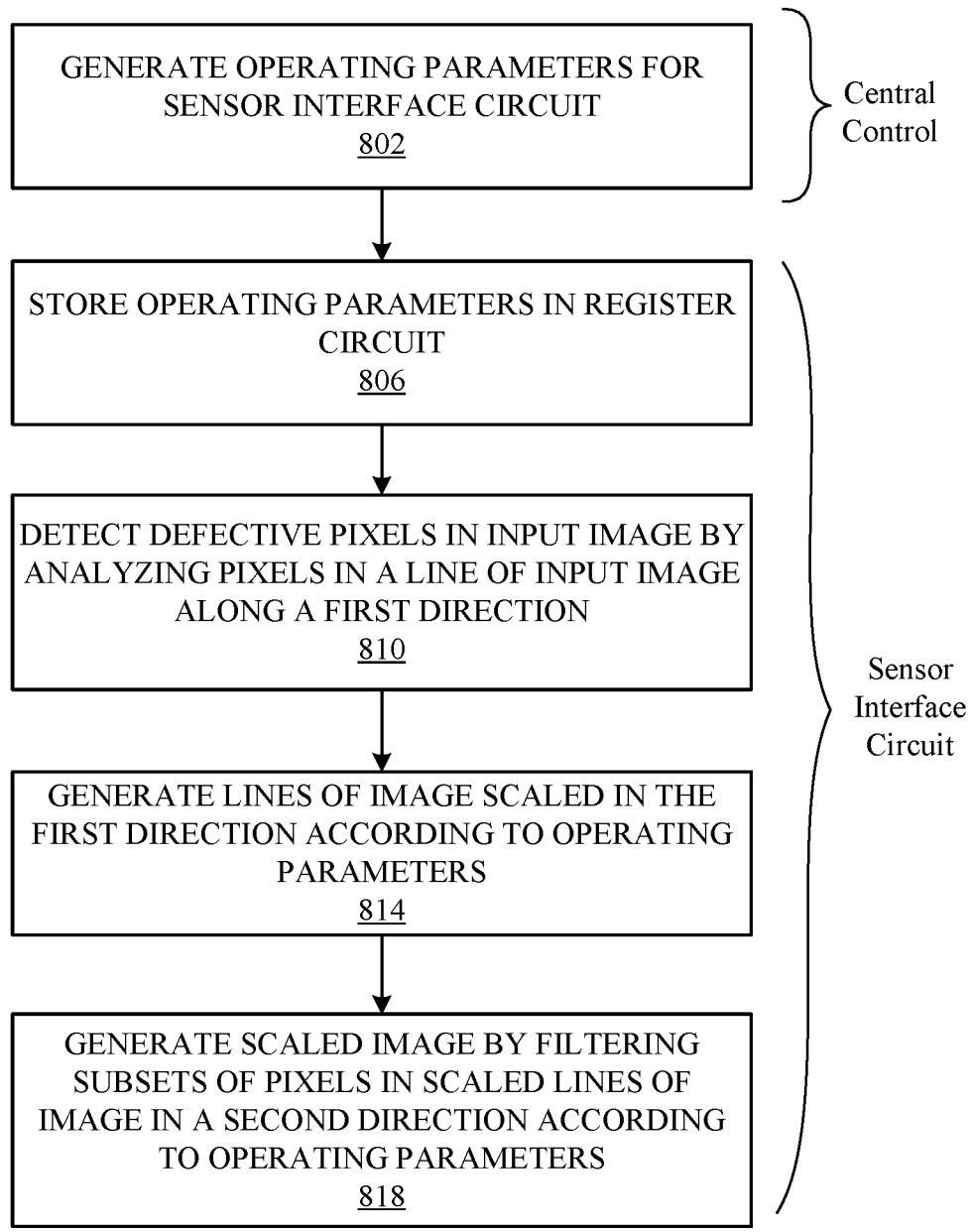
FIG. 8 is a flowchart illustrating an example process for the scaler of the sensor interface, according to one embodiment.

FIG. 8 is a flowchart illustrating an example process for a scaler of the sensor interface 302, according to one embodiment. The central control 320 generates 802 operating parameters for the sensor interface circuit 302. The sensor interface circuit 302 stores 806 operating parameters in the register circuit 510.

The first defect pixel detector detects 810 defective pixels in the input image by analyzing pixels in a line of the input image along a first direction. The first direction may be a horizontal direction. The first defect pixel detector analyzes pixels by determining if the pixel is defective and outputting a defective pixel flag if the pixel is found to be defective.

The operating parameters for the first defect pixel detector may include enable parameters to enable types of first defect pixel detection criteria (e.g., white pixel, black pixel, max neighbor, min neighbor criteria) for detecting first defective pixels, or may include value parameters to set threshold values for pixel detection criteria. When the enable parameter is set to "1," the first defect pixel detector or specific criteria for detecting defective pixels is enabled, and when the enable parameter is set to "0," the first defect pixel detector or specific criterion for detecting defective pixels is disabled. The first defect pixel detector may use threshold values defined by operating parameters to identify defective pixels for different criteria. For example, the operating parameters could include a white pixel threshold, a black pixel threshold, a max neighbor threshold, and a min neighbor threshold.

The first scaler generates 814 lines of image scaled in the first direction according to operating parameters by defining first subsets of pixels in the line of input images so that the first defective pixel is included in only one of the first subset of pixels and filtering each of the defined first subsets of pixels through a first multi-tap polyphase filter to generate the lines of image scaled in the first direction. The first scaler may scale lines of input image according to operating parameters based on the first defective pixel flag for each pixel in the input image and output the lines of scaled data.

The operating parameters for the first scaler may include enable parameters to enable type of scaling method (e.g., two-tap, four-tap polyphase filter), and may include value parameters to set a first size ratio, a first scaling ratio, and a first offset value for scaling lines of pixels. The first scaler may use a first size ratio to set the size of the scaled output image relative to the input image, a first scaling ratio to set the spacing between pixels of the scaled output image relative to the input image in a first direction, and a first offset value to set the position of the pixels in the output image relative to the input image.

The second scaler generates 818 a scaled image by filtering subsets of pixels in scaled lines of the image in a second direction according to operating parameters by defining second subsets of pixels in the line of input images so that the second defective pixel is included in only one of the first subset of pixels and filtering each of the defined second subsets of pixels through a first multi-tap polyphase filter to generate the lines of image scaled in the second direction. The second direction may be a vertical direction. The second scaler generates a scaled image similar to how the first scaler generates a scaled image except the second scaler generates a scaled image in a second direction instead of a first direction.

The operating parameters for the second scaler are similar to the operating parameters for the first scaler except that the operating parameters are used for configuring the second scaler.

The process described above with reference to FIG. 8 is merely an example. Other embodiments may include different and/or additional steps, or perform the steps in different orders. For example, a different embodiment may also include a second pixel detector to detect defective pixels in the input image by analyzing pixels in a line of the input image along a second direction in multiple lines of pixels that are scaled by the first scaling circuit. Moreover, steps 802, 806 and 818 can be omitted in some embodiments. When steps 802 and 806 are omitted, the sensor interface circuit does not use operating parameters to define how components in a sensor interface circuit operate. When step 818 is omitted, the sensor interface only performs scaling in the first direction.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A sensor interface circuit, comprising:
    a register circuit configured to store operating parameters of the sensor interface circuit; and
    a scaling circuit comprising:
        a first defect pixel detection circuit configured to detect a first defective pixel in an input image by analyzing pixels in a line of an input image data along a first direction; and
        a first scaling circuit coupled to the first defect pixel detection circuit, the first scaling circuit configured to generate a scaled line of pixels representing the line of the input image scaled along the first direction according to the operating parameters by:
            (i) defining first subsets of pixels in the line of the input image so that the first defective pixel is included in only one of the first subsets of pixels; and
            (ii) filtering each of the defined first subsets of pixels through a first multi-tap polyphase filter.

2. The sensor interface circuit of claim 1, wherein the scaling circuit further comprises:
    a second scaling circuit configured to generate a scaled image data according to the operating parameters by filtering a plurality of lines of pixels scaled in the first direction by the first scaling circuit through a second multi-tap polyphase filter along a second direction perpendicular to the first direction.

3. The sensor interface circuit of claim 2, wherein the scaling circuit further comprises at least one line buffer between the first scaling circuit and the second scaling circuit to store at least one line of scaled pixels.

4. The sensor interface circuit of claim 2, wherein the scaling circuit further comprises:
    a line buffer, configured to store one or more lines of pixels scaled in the first direction; and
    a second defect detection circuit coupled to the line buffer and the first scaling circuit, the second defect detection circuit configured to detect a second defective pixel in the input image by analyzing, along the second direction, the plurality of lines of pixels scaled in the first direction, wherein
        the second scaling circuit is further configured to define second subsets of pixels along the second direction in the plurality of lines of pixels scaled in the first direction for filtering by the second multi-tap polyphase filter so that the second defective pixel is included in only one of the second subsets of pixels.

5. The sensor interface circuit of claim 2, wherein the input image and the scaled image comprise Bayer pattern encoded data.

6. The sensor interface circuit of claim 1, wherein the first defect pixel detection circuit is configured to determine a pixel in the line as the first defective pixel based on a ratio between a pixel value of the first defective pixel relative to an average of pixel values of a predetermined number of pixels neighboring the first defective pixel.

7. The sensor interface circuit of claim 6, wherein the first defect pixel detection circuit is configured to determine a pixel in the line as the first defective pixel further based on a first ratio between (i) a largest pixel value difference between the neighboring pixels and (ii) a difference between a pixel value of the first defective pixel and a largest pixel value of the neighboring pixels or a second ratio between (i) the largest pixel value difference and (ii) a difference between a pixel value of the first defective pixel and a smallest pixel value of the neighboring pixels.

8. The sensor interface circuit of claim 1, wherein the first multi-tap polyphase filter comprises a two-tap polyphase filter.

9. The sensor interface circuit of claim 1, wherein the register circuit is further configured to receive the operating parameters for storing from a central control circuit during a configuration cycle.

10. A method of interfacing with an image sensor, comprising:
    storing, by a register circuit, operating parameters for configuring operation of a sensor interface circuit;
    detecting, by a first defect pixel detection circuit of the sensor interface circuit, a first defective pixel in an input image by analyzing pixels in a line of an input image along a first direction; and
    generating, at a first scaling circuit of the sensor interface circuit, a scaled line of pixels representing the line of input image scaled along the first direction according to the operating parameters, the scaled line of pixels generated by:
        defining first subsets of pixels in the line of the input image so that the first defective pixel is included in only one of the first subsets of pixels; and
        filtering each of the defined first subsets of pixels through a first multi-tap polyphase filter.

11. The method of claim 10, further comprising:
    detecting, at a second defect detection circuit, a second defective pixel in the input image by at least analyzing a line of pixels along a second direction in a plurality lines of pixels that are scaled by the first scaling circuit, the second direction perpendicular to the first direction;
    defining second subsets of pixels along the second direction in the plurality of scaled lines of pixels so that the second defective pixel is included in only one of the second subsets of pixels; and
    generating, by a second scaling circuit of the sensor interface circuit, a scaled image according to the operating parameters by filtering each of the second subset of pixels through a multi-tap polyphase filter along the second direction.

12. The method of claim 11, further comprising storing a part of the plurality lines of pixels in a line buffer, wherein the stored lines of pixels are read by the second defect detection circuit and the second scaling circuit.

13. The method of claim 11, wherein the input image and the scaled image comprise Bayer pattern encoded data.

14. The method of claim 10, wherein a pixel in the line is determined as the first defective pixel based on a ratio between a pixel value of the first defective pixel relative to an average of pixel values of a predetermined number of pixels neighboring the first defective pixel in the line.

15. The method of claim 14, wherein the pixel in the line is further determined as the defective pixel based on a first ratio between (i) a largest pixel value difference between the neighboring pixels and (ii) a difference between a pixel value of the first defective pixel and a largest pixel value of the neighboring pixels or a second ratio between (i) the largest pixel value difference and (ii) a difference between a pixel value of the first defective pixel and a smallest pixel value of the neighboring pixels.

16. The method of claim 10, wherein the first multi-tap polyphase filter comprises a two-tap polyphase filter.

17. An image signal processor, comprising:
a scaling circuit comprising:
a first defect pixel detection circuit configured to detect a first defective pixel in an input image by analyzing pixels in a line of an input image along a first direction;
a first scaling circuit coupled to the first defect pixel detection circuit, the first scaling circuit configured to generate a scaled line of pixels representing the line of the input image scaled along the first direction by:
(i) defining first subsets of pixels in the line of the input image so that the first defective pixel is included in only one of the first subsets of pixels; and
(ii) filtering each of the defined first subsets of pixels through a first multi-tap polyphase filter; and
a second scaling circuit configured to generate a scaled image by filtering a plurality of lines of pixels scaled in the first direction by the first scaling circuit through a second multi-tap polyphase filter along a second direction perpendicular to the first direction; and
a pipeline coupled to the scaling circuit and configured to perform processing on the scaled image.

18. The image signal processor of claim 17, wherein the input image and the scaled image comprise Bayer pattern encoded data.

19. The image signal processor of claim 17, wherein the scaling circuit further comprises:
a line buffer, configured to store one line of pixels scaled in the first direction; and
a second defect detection circuit coupled to the line buffer and the first scaling circuit, the second defect detection circuit configured to detect a second defective pixel in the input image by analyzing the plurality lines of pixels scaled in the first direction along the second direction,
wherein the second scaling circuit is further configured to define second subsets of pixels along the second direction in the plurality of lines of pixels scaled in the first direction for filtering by the second multi-tap polyphase filter so that the second defective pixel is included in only one of the second subsets of pixels.

20. The image signal processor of claim 17, wherein the first defect pixel detection circuit is configured to determine a pixel in the line as the first defective pixel based on:
a first ratio between a pixel value of the first defective pixel relative to an average of pixel values of a predetermined number of pixels neighboring the first defective pixel;
a second ratio between (i) a largest pixel value difference between the neighboring pixels and (ii) a difference between a pixel value of the first defective pixel and a largest pixel value of the neighboring pixels; or
a third ratio between (i) the largest pixel value difference and (ii) a difference between a pixel value of the first defective pixel and a smallest pixel value of the neighboring pixels.

\* \* \* \* \*

UNITED STATES PATENT AND TRADEMARK OFFICE
CERTIFICATE OF CORRECTION

PATENT NO. : 9,860,429 B1
APPLICATION NO. : 15/198363
DATED : January 2, 2018
INVENTOR(S) : D. Amnon Silverstein and Jaewon Shin It is certified that error appears in the above-identified patent and that said Letters Patent is hereby corrected as shown below:

In the Claims

Claim 11, Lines 50-51: replace "in a plurality lines" with -- in a plurality of lines --.
Claim 12, Line 63: replace "of the plurality lines" with -- of the plurality of lines --.
Claim 19, Line 14: replace "the plurality lines" with -- the plurality of lines --.

Signed and Sealed this
Fifth Day of June, 2018

Andrei Iancu
*Director of the United States Patent and Trademark Office*